(12) United States Patent
Jouanneau-Si-Larbi et al.

(10) Patent No.: US 7,687,200 B2
(45) Date of Patent: Mar. 30, 2010

(54) SEALED PENETRATION FOR LITHIUM BATTERY, ITS METHOD OF FABRICATION AND ITS USE IN A LITHIUM BATTERY AND LITHIUM BATTERY USING SAME

(75) Inventors: Séverine Jouanneau-Si-Larbi, Sillans (FR); Djamel Mourzagh, Fontaine (FR); Pierre Jost, Vizille (FR); Hélène Rouault, Le Versoud (FR); Antoine Lachau-Durand, Bourges (FR); Olivier Nicolas, Arcay (FR)

(73) Assignee: Commissariat A l'Energie Atomique, Paris (FR)

( * ) Notice: Subject to any disclaimer, the term of this patent is extended or adjusted under 35 U.S.C. 154(b) by 247 days.

(21) Appl. No.: 11/942,950

(22) Filed: Nov. 20, 2007

(65) Prior Publication Data
US 2008/0118831 A1    May 22, 2008

(30) Foreign Application Priority Data
Nov. 21, 2006    (FR) .................................. 06 55015

(51) Int. Cl.
  H01M 6/04    (2006.01)
  H01M 2/02    (2006.01)
  H01M 6/00    (2006.01)
  C03B 37/00    (2006.01)
  C03B 27/02    (2006.01)

(52) U.S. Cl. ..................... 429/188; 429/122; 429/181; 65/32.2; 65/59.23

(58) Field of Classification Search ................ 429/188, 429/122, 181; 65/32.2, 59.3
See application file for complete search history.

(56) References Cited

U.S. PATENT DOCUMENTS

| | | | |
|---|---|---|---|
| 5,658,688 A | 8/1997 | Jolson | |
| 5,821,011 A | 10/1998 | Taylor et al. | |
| 6,090,503 A * | 7/2000 | Taylor et al. | ................. 429/181 |
| 6,759,163 B2 | 7/2004 | Frysz et al. | |
| 2001/0055716 A1 | 12/2001 | Frysz et al. | |
| 2003/0096162 A1 * | 5/2003 | Lasater et al. | ................ 429/184 |
| 2003/0134194 A1 | 7/2003 | Lasater | |

FOREIGN PATENT DOCUMENTS

WO    WO 03/041191 A1    5/2003

* cited by examiner

*Primary Examiner*—Patrick Ryan
*Assistant Examiner*—Karie O'Neill Apicella
(74) *Attorney, Agent, or Firm*—Burr & Brown

(57) ABSTRACT

This glass-metal penetration is made from glass, a metal pin and a body. The glass is of the TA23 type and the pin is made using solid platinum/iridium (90/10).

8 Claims, 1 Drawing Sheet

SEALED PENETRATION FOR LITHIUM BATTERY, ITS METHOD OF FABRICATION AND ITS USE IN A LITHIUM BATTERY AND LITHIUM BATTERY USING SAME

TECHNICAL FIELD

The present invention relates to high potential lithium batteries, and more particularly the sealed electrical insulation of such batteries.

It proposes a glass-metal penetration combining a TA23 type glass and a metal pin made from solid platinum/iridium in a body advantageously made from SS304L stainless steel, for an efficient seal.

PRIOR ART

Lithium batteries are increasingly used as self-contained power sources, particularly in portable equipment, where they are progressively replacing nickel-cadmium (NiCd) and nickel-metal hydride (NiMH) batteries.

This development stems from the fact that the performance of lithium batteries, in terms of power density (Wh/kg or Wh/l), is significantly superior to that of the two abovementioned systems. In the medical field, certain units, optionally implantable, are now equipped with lithium batteries.

In the particular application of implants, additional requirements include a longer lifetime (10 years) and above all, a hermetic seal of the complete system over the long term, combined with a need for miniaturization.

The hermetic sealing of such a system is obtained today by a glass-metal penetration comprising a body 3, glass 1 and a metal pin 2, as shown in FIG. 1. This penetration serves to guarantee the insulation of the two polarities of the battery, one provided by the case and the other by a metal pin.

In terms of glassing, compatibility must theoretically exist between the glass and the pin to be glassed. Such compatibility is obtained when the respective coefficients of thermal expansion are similar (to less than $+/-2\times10^{-6}/°C$.).

According to whether the coefficient of thermal expansion of the glass is higher, lower or approximately equal to that of the metal element, the resulting junction may be under compression, under tension or in equilibrium, respectively.

The glass must then also be compatible with the medium with which it is in contact. In the present case, it must in particular be insensitive to attack by the substances contained in the lithium battery, that is the corrosive electrolyte (organic mixture of EC (ethylene carbonate), PC (propylene carbonate), DMC (dimethylcarbonate), etc., combined with a lithium salt, in particular $LiPF_6$, and lithium. Glasses commonly used in this application are TA23 and Cabal 12.

The metal pin must also be stable both chemically and electrochemically. The same applies to the metal body.

During the process, the preformed glass/pin assembly is generally subjected to a given temperature, about 1000° C., to melt the preform and to change the viscosity of the glass, so that it flows and, after cooling, forms the glass element bound to the metal pin and to the support ring (FIG. 1).

To increase the onboard power density in the lithium battery element without increasing its size, one solution is to use a positive electrode material having a higher insertion/deinsertion potential (>3.9V/Li$^+$/Li) than those commonly used for implantable applications (around 3V/Li$^+$/Li).

This condition implies a novel requirement in terms of stability at high potential. In fact, the metal used must not oxidize at this potential, which could cause the salting out of undesirable ion species inside the battery. Moreover, this could have an effect on the seal of the penetration over long lifetimes.

In document WO 03/041191, it is recommended to prepare a mechanical coating of platinum on a pin compatible with Cabal 12 in terms of coefficient of thermal expansion (for example SS446), thereby forming the core of the metal pin element. However, the pin, even provided with such a platinum coating, may remain sensitive to high potentials, particularly if the coating is worn over time.

Document U.S. Pat. No. 5,821,011 illustrates the modification of the composition of Cabal 12 glass, in order to vary the coefficient of thermal expansion of the glass. The purpose is to obtain ideal glassing conditions, that is, similar coefficients of thermal expansion ($<+/-2\times10^{-6}/°C$.) and thereby to proceed with glassings with platinum/iridium for example. Modified Cabal 12 glasses having a coefficient of thermal expansion between 6.8 and $8\times10^{-6}/°C$. can be combined with solid niobium or tantalum, with an optional titanium coating. Modified Cabal 12 glasses having a coefficient of thermal expansion between 8 and $9\times10^{-6}/°C$. can be combined with platinum, platinum/iridium or titanium.

Document U.S. Pat. No. 6,759,163 B describes a glass-metal penetration prepared from elements having an unusual coefficient of thermal expansion (CTE):
- the CTE of the glass is much lower (between $6.3\text{-}6.5\times10^{-6}/°C$.) than the CTE of the pin (between $9.4\text{-}11.7\times10^{-6}/°C$.);
- the CTE of the body is similar to or higher (between $9.5\text{-}19\times10^{-6}/°C$.) than that of the pin.

The technical problem that the present invention proposes to solve is therefore to provide novel glass-metal penetration formulations, having an improved seal, particularly in the context of high potential lithium batteries.

OBJECT OF THE INVENTION

Figure 1:
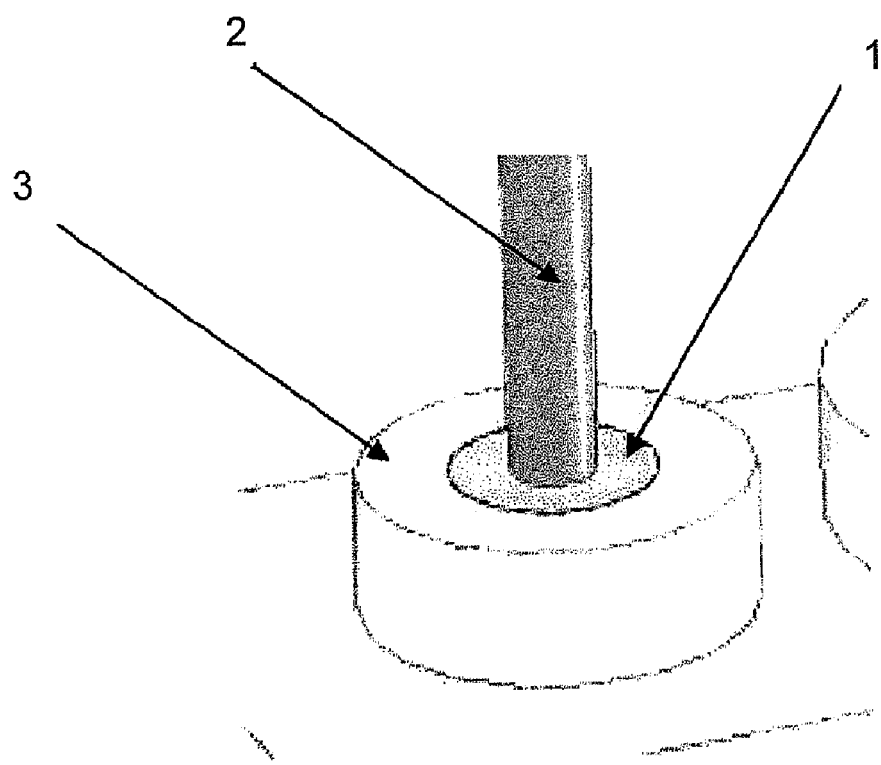
FIG.1 is a prior art illustration of a hermetic seal glass-metal penetration including a body 3, glass 1 and a metal pin 2.

Thus and according to a first aspect, the invention relates to a glass-metal penetration that is characterized in that:
- the glass is type TA23; and
- the pin is made using solid platinum/iridium (90/10).

As a metal pin constituting the positive pole, the invention recommends the use of solid platinum/iridium, consisting of an alloy of platinum and iridium containing 90/10 by weight, having a CTE of $8.7\times10^{-6}/°C$. This material is perfectly inert chemically and electrochemically. According to the invention, the pin of the penetration is made exclusively from this material.

The "TA23 type glass" formulation means that the glass is preferably TA23 (laboratoire Sandia), having a coefficient of thermal expansion of $6.3\times10^{-6}/°C$., and for which it has been previously demonstrated that it is resistant to organic electrolyte medium (EC, PC, DMC type) combined with a lithium salt like LiPF6, therefore potentially containing highly corrosive hydrofluoric acid HF, used for certain Li-ion batteries.

More generally, a glass suitable for the penetration of the invention has the following characteristics:
- good corrosion resistance in organic electrolyte medium combined with a lithium salt;

a CTE value lower than that of the pin, that is, lower than 8.7×10$^{-6}$/° C., and advantageously lower than 8×10$^{-6}$/° C., and even more advantageously lower than 7×10$^{-6}$/° C.

Thus, other glasses can be used, provided they have a resistance and a CTE value close to that of TA23. This is the case for example of Cabal 12, which has a CTE of 6.8×10$^{-6}$/° C.

Such a combination was not basically obvious, because of the incompatibility of the coefficients of thermal expansion between the glass and the metal pin, and in view of the recommendations of the prior art.

Furthermore, the coefficients of thermal expansion of the two pins proposed are outside the "ideal" glassing ranges and are outside (lower or, on the contrary, much higher CTE) the compatibility ranges defined in document U.S. Pat. No. 6,759,163 B.

A glass-metal penetration according to the invention advantageously integrates a body (constituting the negative pole) made from SS304L stainless steel (CTE 19×10$^{-6}$/° C.), furthermore having the advantage of being perfectly stable in the context of a high performance lithium battery.

A glass-metal penetration according to the invention has remarkable qualities:

good electrical resistivity;
high corrosion stability;
tightness lower than or equal to 10$^{-8}$ mbar.l$^{-1}$.

These qualities serve to consider its use as a sealed electrical insulation in high potential lithium batteries (≧3.85V), for medical implants in particular.

The invention relates more particularly to batteries containing an electrolyte or ion conductor consisting of a salt whereof the cation is at least partly the lithium ion (LiClO$_4$, LiAsF$_6$, LiPF$_6$, LiBF$_4$, LiCH$_3$SO$_3$, etc.) in an aprotic solvent (for example ethylene carbonate, propylene carbonate, dimethylcarbonate, diethylcarbonate, methylethylcarbonate).

Even more advantageously, the battery comprises two insertion/deinsertion material electrodes, separated by a separator impregnated with electrolyte.

The positive electrode material is preferably selected from the group of lamellar oxides of the LiMO$_2$ type, where M is a combination of metals comprising at least one transition metal, and the negative electrode material is preferably selected from the group comprising graphite, lithium or Li$_4$Ti$_5$O$_{12}$.

According to another aspect, the invention also relates to a method for fabricating a glass-metal penetration as described above. The method proves to be very simple.

It comprises the following essential steps:

joining of TA23 type glass bead, a body advantageously made from SS304L stainless steel, and a pin made from solid platinum/iridium (90/10); in practice, this step is carried out on a graphite tool.

heating to high temperature, advantageously higher than 1000° C., under reducing atmosphere. This atmosphere can be obtained in the presence of a mixture of nitrogen and hydrogen.

Before the assembly, it is recommended to clean the elementary parts to remove any trace of pollution (particles, residue of machining oil, etc.).

After this method, the penetrations are optionally set for surface treatment, to remove any oxide from the surface of the stainless steel body.

Finally, the penetrations are inspected for hermetic sealing, electrical insulation, and for the visual appearance of the glass bead.

The invention claimed is:

1. A lithium battery comprising a glass metal penetration consisting of glass, a metal pin and a body, wherein the pin is made from solid 90 wt % platinum/10 wt % iridium having a coefficient of thermal expansion of 8.7×10$^{-6}$/° C.; and the glass is resistant to organic electrolyte medium combined with a lithium salt and has a coefficient of thermal expansion lower than 8.7×10$^{-6}$/° C.

2. The lithium battery according to claim 1, wherein the glass has a CTE of 6.3×10$^{-6}$/° C. or a CTE of 6.8×10$^{-6}$/° C.

3. The lithium battery according to claim 1, wherein the body is made from a stainless steel.

4. The lithium battery according to claim 1, wherein it has a tightness lower than or equal to 10$^{-8}$ mbar.l$^{-1}$.

5. The lithium battery according to claim 1, further comprising an electrolyte consisting of a salt, whereof the cation is at least partly the lithium ion in an aprotic solvent.

6. The lithium battery according to claim 5, wherein:
the positive electrode material is selected from the group comprising lamellar oxides of the LiMO$_2$ type, where M is a combination of metals comprising at least one transition metal, and
the negative electrode material is selected from the group comprising graphite, lithium and the oxide Li$_4$Ti$_5$O$_{12}$.

7. The lithium battery according to claim 1, wherein the glass has a coefficient of thermal expansion lower than 8×10$^{-6}$/° C.

8. The lithium battery according to claim 1, wherein the glass has a coefficient of thermal expansion lower than 7×10$^{-6}$/° C.

* * * * *